United States Patent [19]

Allen

[11] 4,121,957

[45] Oct. 24, 1978

[54] METHOD AND APPARATUS FOR PRODUCING PLASTIC FOAM BOARDSTOCK AND PRODUCT THEREOF

[76] Inventor: Samuel B. Allen, 126 King William Dr., Newark, Del. 19711

[21] Appl. No.: 801,073

[22] Filed: May 27, 1977

[51] Int. Cl.² ............................................. B32B 31/12
[52] U.S. Cl. .................................... 156/79; 264/46.2; 427/369; 427/373
[58] Field of Search .................... 156/78, 77, 79, 500; 264/45.8, 46.2, 46.3, 258, 46.4, 46.5, 45.3; 428/170, 218, 310; 427/359, 361, 362, 369, 370, 373

[56] References Cited

U.S. PATENT DOCUMENTS

| | | | |
|---|---|---|---|
| 2,648,619 | 8/1953 | Alderfer | 156/78 |
| 2,677,008 | 4/1954 | Fairclough et al. | 264/258 |
| 2,841,515 | 7/1958 | Runton | 156/78 |
| 3,196,030 | 7/1965 | Petry | 428/218 |

Primary Examiner—Douglas J. Drummond
Assistant Examiner—William H. Thrower
Attorney, Agent, or Firm—Connolly and Hutz

[57] ABSTRACT

A pour urethane foam mixture is deposited on a thin porous non-woven fiberglass mat through which it is driven by an eccentric hexagonal beater bar. The space below the mat is limited by a second mat through which the uncured foam mixture penetrates to a lesser extent. The foam-penetrated pair of mats are led through an oven which accelerates curing of the urethane into reinforced boardstock having a precise thickness, a smooth upper surface and a uniform bottom surface that is cast onto a release surface or bonded to a flexible backing sheet such as paper or rigid substrate.

5 Claims, 3 Drawing Figures

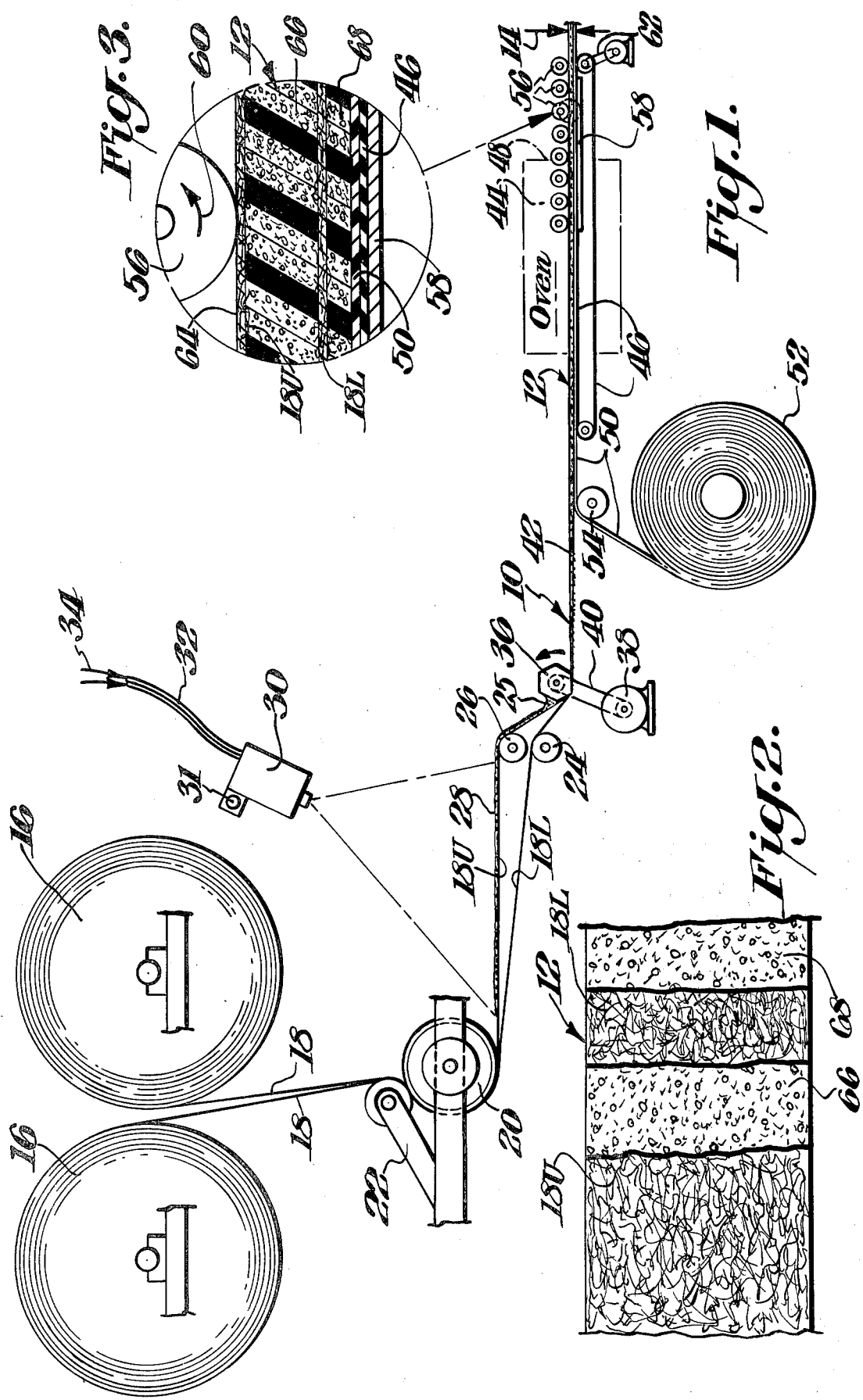

METHOD AND APPARATUS FOR PRODUCING PLASTIC FOAM BOARDSTOCK AND PRODUCT THEREOF

BACKGROUND OF THE INVENTION

U.S. Pat. No. 3,960,998 by the same inventor relates to a method of producing large rigid foam panels in which a flexible ribbon is coated on one side with plastic foam and immediately thereafter laid on a form with the foam coated side disposed against the form. A number of lengths are laid side-by-side on the form with the edges flowing and cohering together to provide a panel having the shape of the form. An object of this invention is to provide a method and apparatus for making foam plastic boardstock either per se or adhered to another surface, such as a backing sheet or a flat roof.

SUMMARY

A pour urethane foam mixture is deposited on a thin porous fiberglass mat through which it is driven by an eccentric beater bar, such as a hexagonal beater bar. The space below the bar is limited by an underlying sheet through which the liquid mixture may penetrate to a lesser extent. The liquid-penetrated pair of mats are led through an oven which accelerates foaming and curing of the urethane into a reinforced boardstock having a precise thickness, a smooth upper surface and a uniform bottom surface that is cast onto a release surface or bonded to a flexible backing sheet such as paper or rigid substrate such as plywood.

BRIEF DESCRIPTION OF THE DRAWINGS

Novel features and advantages of the present invention will become apparent to one skilled in the art from a reading of the following description in conjunction with the accompanying drawing wherein similar reference characters refer to similar parts and in which:

FIG. 1 is a schematic side view in elevation showing one embodiment of a method and apparatus for practicing this invention;

FIG. 2 is a top plan view partially broken away showing a product which is an embodiment of this invention; and FIG. 3 is an enlarged cross-sectional view of the phantom-circled portion shown in FIG. 1.

DESCRIPTION OF THE PREFERRED EMBODIMENT

FIG. 1 shows apparatus 10 for producing an elongated foam plastic board 12 such as urethane foam. Board 12 is discharged at the right hand end of apparatus 10 at which it is cut to predetermined lengths by cutoff device 14. Apparatus 10 includes a pair of supply rolls 16 feeding a pair of fiberglass mats 18 to a rubber-covered dispensing roller 20 restrained by a magnetic brake 21 against which they are held in substantially firm contact by gravity-biased idler roller assembly 22. Fiberglass mats 18 are, for example, about 0.008 inch thick, 36 inches wide and weigh about 0.9 lbs./100 square feet. A suitable product is sold by the Johns Mansville Co., as Duraglass style No. 7120 ER. Other suitable porous material which has the required strength, uniformity and compatibility with the plastic foam may also be utilized.

Glass mats 18 assume separate paths of travel from dispensing roller 20 and they are thereafter designated 18U and 18L to distinguish between their upper and lower dispositions. Mat 18L is diverted at an angle below mat 18U by disposition over lower guide roller 24, whereas upper mat 18U is disposed in a substantially horizontal path from rubber covered dispensing roller 20 to upper guide roller 26. The length of upper mat 18U between dispensing roller 20 and upper guide roller 26 is coated with a liquid urethane pour type foam mixture 28 applied by reciprocating fan-pattern nozzle head 30, which is driven from side to side across almost the full width of mat 18U by lead screw 31. The urethane A and B components are supplied to dispensing nozzle head 30 through multiple conduit 32 in the direction of arrow 34.

Nozzle head 30 is, for example, part of a plural component dispensing device described in U.S. Pat. No. 3,799,403. Such a device is made and sold by the Ransburg Company under the name "Mini-Probler".

The urethane mixture has two components as follows:

A. Polymeric Isocyanate, such as Mondur MR by Mobay Chemical Co., or MDI Quasi-Prepolymer.

B. A polyol plus fluorocarbon 11 and/or fluorocarbon 113 plus catalyst plus a surfactant, such as a Witco Chemical Co. System, ISOFOAM TM R-0478B. ISOFOAM TM R-0478 is a rigid polyurethane foam system that can either be conventionally poured or froth-foamed. This system is based on a polymeric isocyanate and is used in the marine, transportation and commercial refrigeration industries. R-0478B contains amines and trichlorofluoromethane. Both materials must be handled and used where adequate mechanical ventilation is provided to avoid breathing their vapors. The vapors must not exceed the TLV for isocyanates. Contact with the skin or eyes must be avoided. A flame retardant may also be added as part of the A or B component. The composition may be described as a pour-type urethane foam system having the following free-rise properties at room temperature:

(1) 17–30 second cream time;
(2) 2 to 3 minute rise;
(3) 2 minute tack-free time;
(4) 2 lb./cu. ft. density.

Upper and lower mats 18U and 18L contact each other under chrome-plated hexagonal beater roller 36, which is driven at a suitable speed (1500 R.P.M.) by motor 38 and timing belt transmission 40. The small angle A, such as about 30°, between mats 18U and 18L, as they converge under hexagonal beater roller 36, facilitates the passage of applied composition 28 through upper mat 18U into the space 42 between fiberglass mats 18U and 18L.

Hexagonal bar 36 drives the foam mixture 28 down through top mat 18U. Top mat 18U acts as a screen to obtain uniform strike-through of foam mixture 28. Foam mixture 28 strikes through top mat 18U and collects between the two mats 18U and 18L. Some of the foam mixture builds up a small rolling bank 25 before rotating hexagonal bar 36 and helps smooth out irregularities in the amount of foam mixture deposited by the traversing fan pattern of chemical coating 28.

Once the uniform foam mixture is trapped between the two webs (mats 18U and 18L), it begins to react (cream) and increase in viscosity. As the reacting material increases in viscosity, its ability to strike through either of the mats decreases. The foam mixture expands and cures between the two mats. The foam that strikes through the bottom mat is bondable to a substrate (as later described). The foam mixture remaining in the top mat cures and forms a smooth skin on the top surface.

The foam mixture can expand up to thirty times its original volume in curing. The following variables affect uniformity and thickness of the manufactured urethane boardstock:

(1) Rate of discharge of mixture & traversing rate of fan pattern;

(2) Tension on web (about ½ lb./inch width) at the hexagonal bar which must be uniform to assure driving all of the foam mixture down through the top mat 18U; and (3) Speed of web which governs dwell time at hexagonal bar 36 and time in oven. Such speed is usually about 15 feet per minute.

Mats 18U and 18L with inserted foam mixture passes from hexagonal beater bar 36 to curing oven 44 through which it is guided by a conveyor belt assembly 46, such as having a rubber conveyor belt. Oven 44 shortens the curing or setting time of the urethane foam and minimizes the guided length of boardstock necessary to set it in a flat precise form. Oven 44 is, for example, approximately 40 feet long, and a 20 foot length of conveyor 46 is provided past exit 48 from oven 44 to cutoff device 14. Oven 44 is maintained at a temperature of approximately 70° C. to set the foam plastic board 12 within the described length.

A supporting sheet 50, for example, of strong kraft paper about 0.002 inch thick is fed from supply roller 52, disposed under sheet 12 issuing from hexagonal beater 36, over idler roller 54 under foam board 12. Board 12 is still tacky and, therefore, firmly adheres to supporting sheet 50. A release-coated support sheet, such as polypropylene may also be used if a bare board of foam material is desired. Conveyor 46 may also be release-coated and sheet 12 may rest directly upon it when support sheet 50 is eliminated.

A series of idler drive rollers 56 are disposed on top of boardstock 12, as shown in detail in FIG. 3. A platen 58 is disposed within conveyor belt assembly 46 to react against idler drive rollers 56 to grasp board stock 12 between them to cause conveyor 46 to drive it in the direction of arrow 60 through apparatus 10 to terminal cutoff device 14. The drive provided by conveyor 46 is approximately 15 feet per minute actuated by motor drive assembly 62.

FIGS. 2 and 3 show the final structure of board 12 which includes a smooth skin 64 on its upper surface over upper fiberglass mat 18U. A core of foamed polyurethane 66 is disposed inbetween upper fiberglass mat 18U and lower fiberglass mat 18L. A lower course 68 of foam polyurethane 66 is disposed under lower fiberglass mat 18L through which it has passed in response to the impelling force of hexagonal beater roller 36. Lower polyurethane core 68 is bonded to support paper sheet 50 to which it is adhered prior to curing. Paper sheet 50 rests on conveyor belt 46 which supports and conveys boardstock 12 until it is completely cured.

The process, apparatus and product of this invention have the following advantages:

(1) The foam mixture is smoothed into the fiberglass mats by the rotating hexagonal bar before it begins to react (cream).

(2) Most of the foam mixture is held between the two fiberglass mats so that it can be transported to the substrate while rising and curing.

(3) The fiberglass becomes an integral reinforcing within the urethane foam.

(4) The urethane foam need not be surfaced (faced).

(5) Trapping the foam mixture between the two flat non-woven mats helps to mold the foam into a flat profile as it rises and cures.

(6) The fiberglass mat reinforcing is inexpensive and restrains the foam so as to make it more dimensionally stable under temperature and humidity changes.

(7) Boardstock can be readily removed from a release-surfaced conveyor belt after curing to a tack-free condition. Removal from the belt is facilitated by the much higher bond strength of foam to glass mat vs. foam to release surface.

(8) An additional layer of fiberglass mat can be introduced into the process for additional reinforcing.

(9) The foam mixture that remains on the top mat forms a smooth-skinned surface. The smooth skin facilitates bonding of protective sheeting or membranes to the surface and imparts additional compressive strength to the foam surface.

(10) The hexagonal bar (rotating) is easily cleaned off by pulling out a few inches of fiberglass mat without depositing fresh foam mixture on the web.

(11) The foam mixture is more thoroughly mixed and homogenized when it is forced through the fiberglass mat by the hexagonal bar (rotating) and by the shearing action of hexagonal bar against the foam mixture coated mat.

(12) Adjusting the position of guide roller 24 will vary the proportion of foam mixture that is between the mats and that strikes through the bottom mat.

(13) Boardstock made of this free-rise process is less expensive and has more uniform cell structure and density compared with boardstock that is molded under pressures of 5 to 10 PSI in conventional processes.

I claim:

1. A method of producing boardstock of plastic foam composition comprising the steps of depositing an uncured liquid composition of the plastic foam of the pour type on one surface of an elongated porous sheet, beating the applied liquid composition against the surface of the porous sheet upon which it is deposited, maintaining the other surface of the porous sheet free of pressure opposite the area at which the liquid composition is beated against the first-mentioned surface of the porous sheet, whereby a controlled amount of liquid composition is driven through the porous sheet, supplying a lower sheet under the porous sheet whereby the thickness of a layer of foam plastic driven through the porous sheet is defined, and curing the plastic foam to adhere the components together in a boardstock.

2. A method as set forth in claim 1, wherein the lower sheet is also porous to cause the plastic foam to also pass through it.

3. A method as set forth in claim 2, wherein the uncured plastic foam is caused to pass a short distance through and beyond the porous lower sheet to provide a lower surface which can readily adhere to a support surface before the plastic foam cures.

4. A method as set forth in claim 1, wherein the upper surface of the porous sheet is wiped before the plastic foam cures to provide a smooth tough skin on top of the cured boardstock.

5. A method as set forth in claim 1, wherein the plastic foam is heated to accelerate its curing.

* * * * *